United States Patent
Person

(10) Patent No.: US 8,026,800 B2
(45) Date of Patent: Sep. 27, 2011

(54) METHODS AND SYSTEMS FOR CONTROLLING EXTERNAL VISUAL INDICATORS FOR VEHICLES

(75) Inventor: Mark J. Person, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 440 days.

(21) Appl. No.: 12/198,600

(22) Filed: Aug. 26, 2008

(65) Prior Publication Data

US 2010/0052883 A1    Mar. 4, 2010

(51) Int. Cl.
*B60Q 1/00* (2006.01)

(52) U.S. Cl. ........ 340/435; 340/463; 340/468; 340/469; 340/471; 340/472

(58) Field of Classification Search .................. 340/435, 340/463, 468, 469, 471, 472
See application file for complete search history.

(56) References Cited

U.S. PATENT DOCUMENTS

| | | | | |
|---|---|---|---|---|
| 3,786,507 A | * | 1/1974 | Hurd, Jr. | 342/70 |
| 3,868,629 A | * | 2/1975 | Caine | 340/435 |
| 5,162,794 A | * | 11/1992 | Seith | 340/903 |
| 5,663,705 A | * | 9/1997 | Pretorius et al. | 340/435 |
| 6,240,346 B1 | * | 5/2001 | Pignato | 701/35 |
| 6,411,204 B1 | * | 6/2002 | Bloomfield et al. | 340/467 |
| 6,914,521 B2 | * | 7/2005 | Rothkop | 340/425.5 |
| 2007/0109111 A1 | * | 5/2007 | Breed et al. | 340/435 |

* cited by examiner

*Primary Examiner* — Travis Hunnings
(74) *Attorney, Agent, or Firm* — Ingrassia Fisher & Lorenz, P.C.

(57) ABSTRACT

A method for controlling operation of an external visual indicator includes the steps of determining whether a second vehicle is approaching the first vehicle, and modifying the external visual indicator if the second vehicle is approaching the first vehicle.

20 Claims, 2 Drawing Sheets

METHODS AND SYSTEMS FOR CONTROLLING EXTERNAL VISUAL INDICATORS FOR VEHICLES

TECHNICAL FIELD

The present invention generally relates to the field of vehicles and, more specifically, to methods and systems for controlling external visual indicators for vehicles.

BACKGROUND OF THE INVENTION

Many vehicles include various external visual indicators that provide information or warnings pertaining to the vehicle to the occupants of other nearby vehicles. For example, vehicles generally include one or more blinking hazard lights that serve notice that the vehicle is not operating properly. In addition, vehicles generally include turn signals that blink when the vehicle is making a turn and that indicate the direction of the turn. However, when another vehicle is approaching, it is possible that the occupants of the approaching vehicle may not notice the external visual indicators as early as is optimal.

Accordingly, it is desirable to provide an improved method for controlling an external visual indicator for a vehicle that provides improved notification or warnings to occupants of approaching vehicles. It is also desirable to provide an improved program product for such controlling of an external visual indicator for a vehicle. It is further desired to provide an improved system for such controlling of an external visual indicator for a vehicle. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for controlling operation of an external visual indicator for a first vehicle is provided. The method comprises the steps of determining whether a second vehicle is approaching the first vehicle, and modifying the external visual indicator if the second vehicle is approaching the first vehicle.

In accordance with another exemplary embodiment of the present invention, a program product for controlling operation of an external visual indicator for a first vehicle is provided. The program product comprises a program and a computer-readable signal-bearing media. The program is configured to at least facilitate determining whether a second vehicle is approaching the first vehicle, and modifying the external visual indicator if the second vehicle is approaching the first vehicle. The computer-readable signal-bearing media bears the program.

In accordance with a further exemplary embodiment of the present invention, a system for controlling operation of an external visual indicator for a first vehicle is provided. The system comprises a detection unit and a controller. The detection unit is configured to at least facilitate obtaining information regarding the first vehicle and a second vehicle. The controller is configured to be coupled to the detection unit and to the external visual indicator. The controller is configured to at least facilitate determining, based at least in part on the information, whether the second vehicle is approaching the first vehicle, and modifying the external visual indicator if the second vehicle is approaching the first vehicle.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
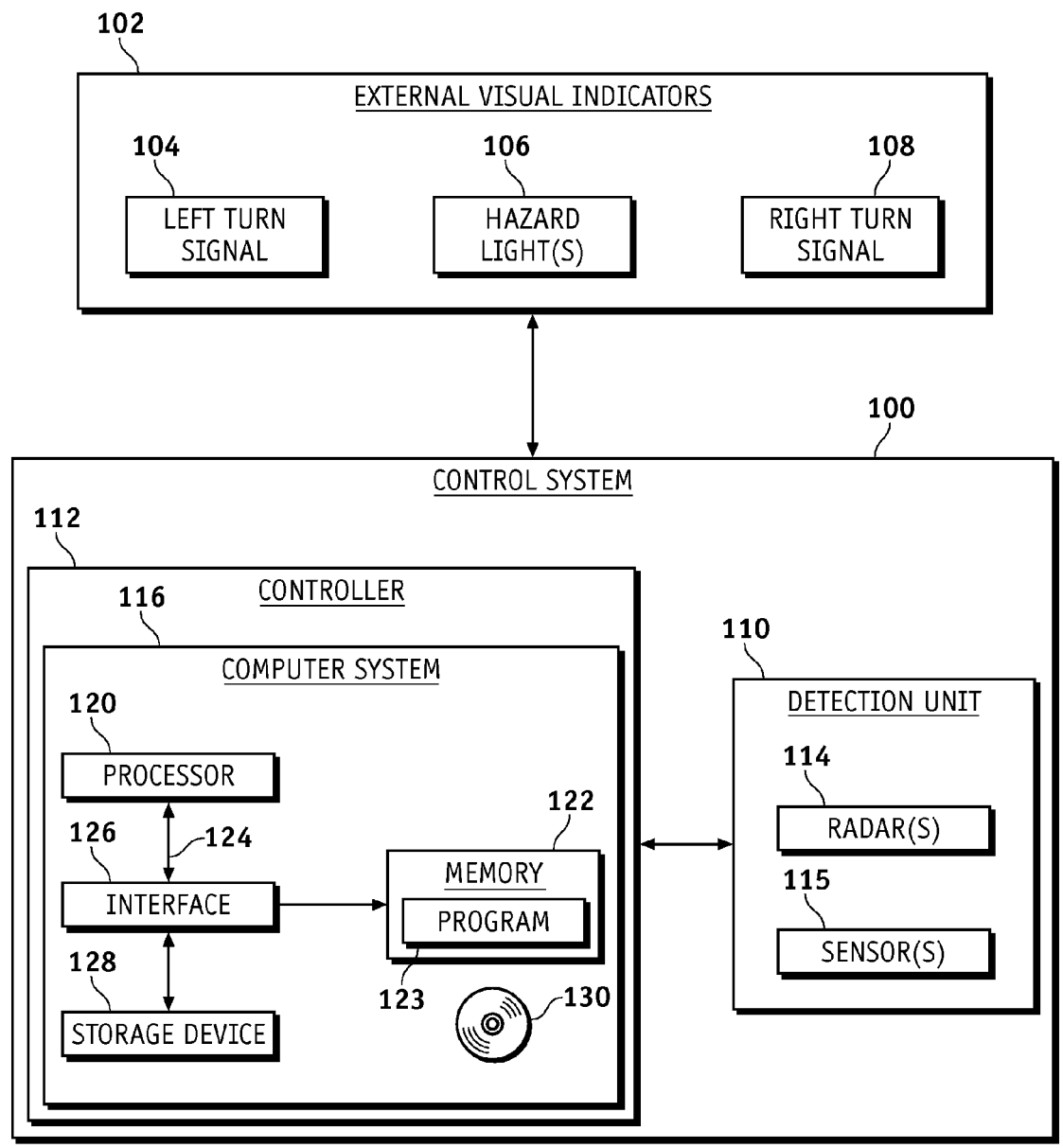
FIG. 1 is a functional block diagram of a control system for controlling one or more external visual indicators for a vehicle, depicted along with exemplary external visual indicators for the vehicle, in accordance with an exemplary embodiment of the present invention.

FIG. 1 is a functional block diagram of a control system 100 for controlling one or more external visual indicators 102 of a vehicle, in accordance with an exemplary embodiment of the present invention. In certain preferred embodiments, the vehicle comprises an automobile such as a sedan, a truck, a van, a sport utility vehicle, or another type of automobile. However, in various embodiments, the control system 100 can be used in connection with any number of types of vehicles.

As depicted in FIG. 1, in one preferred embodiment, the external visual indicators 102 include a left turn signal 104, one or more hazard lights 106, and a right turn signal 108. The left turn signal 104, typically disposed on the left rear of a vehicle, blinks to indicate that the vehicle is making a left turn. The right turn signal 104, typically disposed on the right rear of a vehicle, blinks to indicate that the vehicle is making a right turn. The one or more hazard lights 106, which can include both the left and right turn lights and/or other lights visible at the rear of the vehicle, blink to indicate that the vehicle is not functioning properly. Each of the left turn signal 104, the one or more hazard lights 106, and the right turn signal 108 has an intensity and a blinking rate when in operation, that is, when blinking.

As will be described below, in a preferred embodiment, the control system 100 modifies the intensity and/or blinking rate of these external visual indicators 102 using a process 200 set forth in FIG. 2 and described further below, in situations during which another vehicle is approaching. In the depicted embodiment, the control system 100 includes a detection unit 110 and a controller 112.

The detection unit 110 is coupled to the external visual indicators 102 and to the controller 112. The detection unit 110 is configured to obtain information regarding the first vehicle and a second vehicle. Specifically, in a preferred embodiment, the detection unit 110 is configured to detect information as to a position and path of the first vehicle and a position and path of a second vehicle, for use by the controller 112 in determining whether such a second vehicle is approaching the first vehicle. In addition, as described further below, in certain preferred embodiments this information is also used by the controller 112 in determining the following: a path in which such a second vehicle is traveling, whether such a second vehicle is attempting to move into an intended path of the first vehicle, whether the first vehicle is moving, a frequency of other vehicles approaching the first vehicle over a time period, and whether one or more of the external visual indicators 102 is in operation.

In the depicted embodiment, the detection unit 110 includes one or more radars 114 and one or more sensors 115. The one or more radars 114 and sensors 115 provide information to the controller 112 for use in making the above-referenced determinations. For example, in one preferred embodiment, the radars 114 send signals to the controller 112 regarding positions and movement of the first vehicle and other vehicles for use in determining the following: whether a second vehicle is approaching, a path in which such a second vehicle is traveling, whether such a second vehicle is attempting to move into an intended path of the first vehicle, and a frequency of other vehicles approaching the first vehicle over a time period. In a preferred embodiment, such radars 114 are positioned on a rear side of the vehicle, a left side of the vehicle, and a right side of the first vehicle to obtain information as to positions or movement of vehicles approaching from behind the first vehicle and to the right and left sides of the first vehicle. However, the positioning of the radars 114 may vary in other embodiments.

Also in a preferred embodiment, the sensors 115 send signals to the controller 112 regarding one or more positions or statuses of the first vehicle or components thereof for use in determining the following: whether the first vehicle is moving, whether one or more of the external visual indictors 102 are in operation, a current path of the first vehicle, and an intended path of the first vehicle. In a preferred embodiment, one or more of the sensors 115 are coupled to the external visual indicators 102 to obtain information as to whether one or more of the external visual indicators 102 are in operation. Also in a preferred embodiment, one or more sensors 115 are coupled to one or more road wheels of the first vehicle to obtain information as to whether the first vehicle is moving and to determine a current path of the first vehicle. In addition, in a preferred embodiment, one or more sensors 115 are coupled to a steering column of the first vehicle to obtain information as to an intended path of the first vehicle. However, the configuration of the sensors 115 may also vary in other embodiments.

The controller 112 is coupled to the detection unit 110 and the external visual indicators 102. The controller 112 is configured to modify the external visual indicators 102 under certain conditions in which a second vehicle is approaching the first vehicle, so as to notify or warn the second vehicle regarding a status of the first vehicle (for example, as to whether the first vehicle is attempting to turn into an intended lane, or as to whether the first vehicle is moving slowly or not at all). The controller 112 preferably modifies the external visual indicators 102 in accordance with the steps of the process 200 described further below in connection with FIG. 2, based on information provided to the controller 112 by the detection unit 110.

In certain preferred embodiments, the controller 112 increases the blinking rate and/or the intensity of one or more of the external visual indicators 102 if such one or more external visual indicators 102 are in operation. Such modifications are preferably based on the above-described determinations as to the following: whether a second vehicle is approaching the first vehicle, a path in which such a second vehicle is traveling, whether such a second vehicle is attempting to move into an intended path of the first vehicle, whether the first vehicle is moving, and a frequency of other vehicles approaching the first vehicle over a time period. In a preferred embodiment, these determinations may be made by the controller 112 based on signals or other information provided by the detection unit 110 as to positions and movement of the first vehicle, the second vehicle, and/or other vehicles.

As depicted in FIG. 1, the controller 112 includes a computer system 116 coupled between the external visual indicators 102 and the detection unit 110. In the depicted embodiment, the computer system 116 includes a processor 120, a memory 122, a computer bus 124, an interface 126, and a storage device 128. The processor 120 performs the computation and control functions of the computer system 116 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 123 preferably stored within the memory 122 and, as such, controls the general operation of the computer system 116.

In a preferred embodiment, the processor 120 receives the above-described information from the radars 114 and/or sensors 115 of the detection unit 110 regarding the position and movement of the first vehicle and any approaching vehicles, processes this information, and modifies the external visual indicators 102 as appropriate to warn oncoming vehicles of a position, movement, or status of the first vehicle (for example, as to whether the first vehicle is turning into an intended lane or whether the first vehicle is traveling slowly or not at all). In so doing, the processor 120 preferably executes one or more programs 123 stored in the memory 122.

As referenced above, the memory 122 stores a program or programs 123 that execute one or more embodiments of processes such as the process 200 described below in connection with FIG. 2 and/or various steps thereof and/or other processes, such as those described elsewhere herein. The memory 122 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 122 may be a single type of memory component, or it may be composed of many different types of memory components. In addition, the memory 122 and the processor 120 may be distributed across several different computers that collectively comprise the computer system 116. For example, a portion of the memory 122 may reside on a computer within a particular apparatus or process, and another portion may reside on a remote computer.

The computer bus 124 serves to transmit programs, data, status and other information or signals between the various components of the computer system 116. The computer bus 124 can be any suitable physical or logical means of connecting computer systems and components. This includes, but is not limited to, direct hard-wired connections, fiber optics, infrared and wireless bus technologies.

The interface 126 allows communication to the computer system 116, for example from a vehicle occupant, a system operator, and/or another computer system, and can be implemented using any suitable method and apparatus. In certain embodiments, the interface 126 provides the information from the detection unit 110 to the processor 120 and provides instructions from the processor 120 to the external visual indicators 102 for modifications to the external visual indicators 102. The interface 126 can include one or more network interfaces to communicate within or to other systems or components, one or more terminal interfaces to communicate with technicians, and one or more storage interfaces to connect to storage apparatuses such as the storage device 128.

The storage device 128 can be any suitable type of storage apparatus, including direct access storage devices such as hard disk drives, flash systems, floppy disk drives and optical disk drives. In one exemplary embodiment, the storage device 128 is a program product from which memory 122 can receive a program 123 that executes one or more embodiments of the process 200 of FIG. 2 and/or steps thereof as described in greater detail further below. In one preferred embodiment, such a program product can be implemented as part of, inserted into, or otherwise coupled to the control system 100. As shown in FIG. 1, the storage device 128 can comprise a disk drive device that uses disks 130 to store data. As one exemplary implementation, the computer system 116 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 130), and transmission media such as digital and analog communication links. It will similarly be appreciated that the computer system 116 may also otherwise differ from the embodiment depicted in FIG. 1, for example in that the computer system 116 may be coupled to or may otherwise utilize one or more remote computer systems and/or other control systems.

Figure 2:
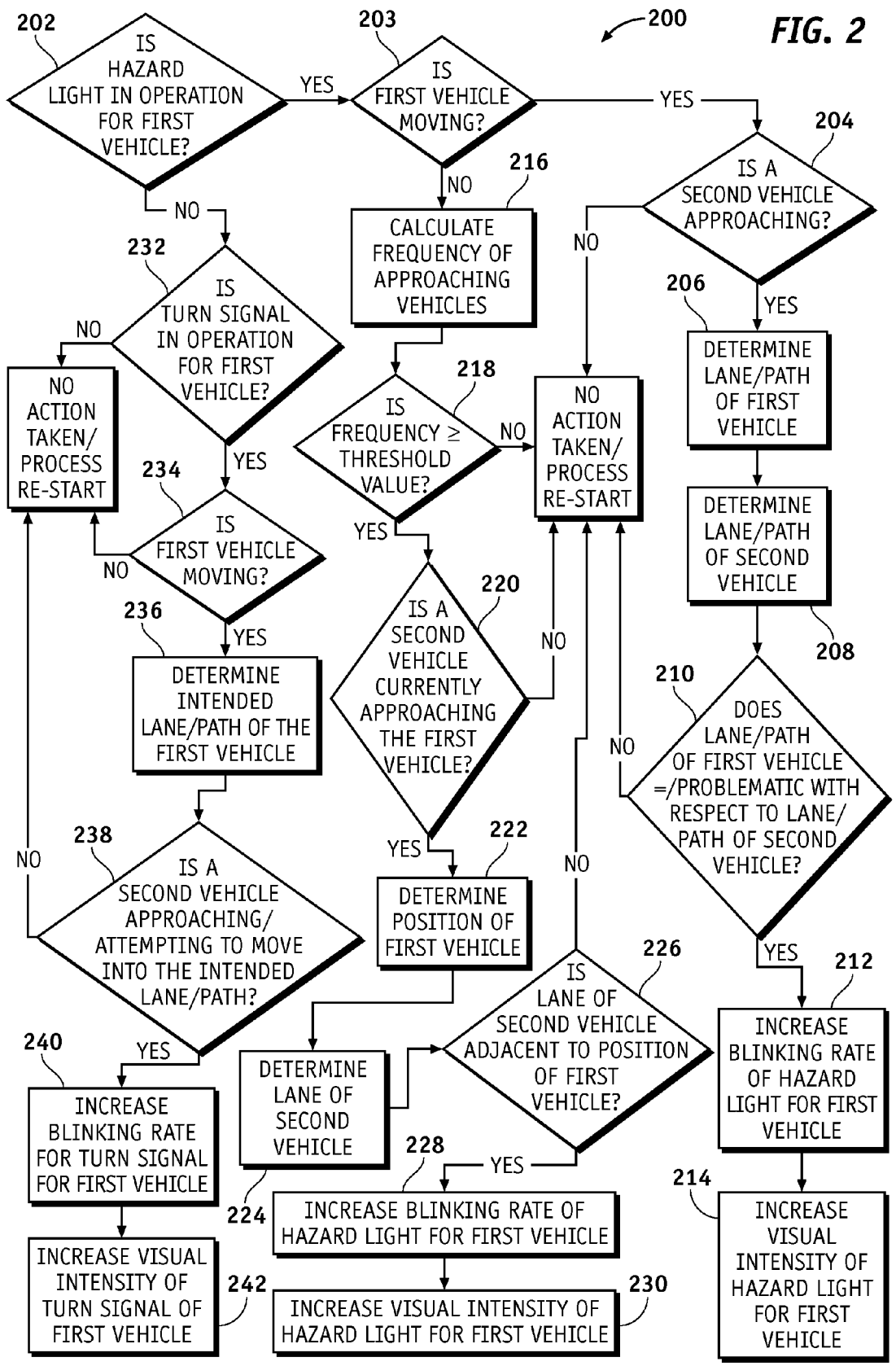
FIG. 2 is a flowchart of a process for controlling one or more external visual indicators of a vehicle, and that can be implemented in connection with the control system of FIG. 1, in accordance with an exemplary embodiment of the present invention.

FIG. 2 is a flowchart of a process 200 for controlling one or more external visual indicators of a vehicle, in accordance with an exemplary embodiment of the present invention. In a preferred embodiment, the process 200 can be implemented in connection with the control system 100 of FIG. 1 and/or through program products that can be utilized in connection therewith. However, it will be appreciated that in various embodiments the process 200 may also be utilized in connection with any number of different types of systems and/or other devices.

As depicted in FIG. 2, the process 200 includes the step of determining whether a hazard light of the vehicle is in operation, that is, whether the hazard light is blinking (step 202). In a preferred embodiment, this determination is made by the processor 120 of FIG. 1 based on information provided by one or more sensors 115 of the detection unit 110 of FIG. 1 with respect to one or more hazard lights 106 of FIG. 1. If it is determined in step 202 that the hazard light is on, then a further determination is made as to whether the first vehicle is moving (step 203). Otherwise, the process instead proceeds to step 232, described further below.

In a preferred embodiment, the determination in step 203 as to whether the first vehicle is moving is made by the processor 120 of FIG. 1 based on information provided by one or more sensors 115 of FIG. 1, such as a wheel speed sensor. If it is determined that the vehicle is moving, then a determination is made as to whether a second vehicle is approaching (step 204). Otherwise, the process instead proceeds to step 216, described further below. In a preferred embodiment, this determination in step 204 is made as to whether a second vehicle is approaching from behind the first vehicle, although this may vary in other embodiments. Also in a preferred embodiment, this determination is made by the processor 120 of FIG. 1 based on information provided by one or more radars 114 of the detection unit 110 FIG. 1.

If it is determined in step 204 that a second vehicle is approaching, determinations are made as to a lane or path of the first vehicle (step 206) and a lane or path of the second vehicle (step 208). Otherwise, no action is taken, and the process preferably re-starts at step 202. In a preferred embodiment, the determinations as to the lanes or paths of the first and second vehicles are made by the processor 120 of FIG. 1 based on information provided by one or more radars 114 of the detection unit 110 of FIG. 1.

A determination is then made as to whether the lane or path of the first vehicle is "problematic" relative to the lane or path of the second vehicle (step 210). In a preferred embodiment, the respective lanes or paths of the first and second vehicles are determined to be "problematic" if the lanes or paths will intersect or run parallel in a manner that would likely lead to a collision between the first and second vehicles if the first and second vehicles continue to move in their current lanes or paths. In a most preferred embodiment, the lane or path of the first vehicle is "problematic" if it is at least substantially the same lane or path as the second vehicle. This determination is also preferably made by the processor 120 of FIG. 1 using information provided by the detection unit 110 of FIG. 1.

If a determination is made that the lane or path of the first vehicle is not problematic with respect to the lane or path of the second vehicle, then no action is taken, and the process preferably re-starts at step 202. However, if a determination is made that the lane or path of the first vehicle is problematic with respect to the lane or path of the second vehicle, then one or more modifications to the hazard light are introduced. Specifically, in one embodiment, the blinking rate of the hazard light is increased (step 212). In another embodiment, the visual intensity of the hazard light is increased (step 214). In a preferred embodiment, the hazard light's blinking rate and visual intensity are both increased. Also in a preferred embodiment, these modifications to the hazard light are performed by the controller 112 of FIG. 1, most preferably by the processor 120 thereof. In certain embodiments, multiple hazard lights on the vehicle may be similarly modified.

As referenced above, if it is determined in step 203 that the first vehicle is not moving, the process proceeds to step 216. In step 216, a frequency of approaching vehicles is calculated. In a preferred embodiment, the frequency of approaching vehicles is calculated by the processor 120 of FIG. 1 based on information provided by one or more radars 114 of FIG. 1. A determination is then made as to whether the frequency of vehicles approaching the first vehicle is greater than or equal to a predetermined threshold value (step 218). In one preferred embodiment, the predetermined threshold value is equal to one approaching vehicle every five seconds; however, this may vary in other embodiments.

If it is determined that the frequency of vehicles approaching the first vehicle is greater than or equal to the predetermined threshold value, then no action is taken, and the process preferably re-starts at step 202. Otherwise, if it is determined that the frequency of vehicles approaching the first vehicle is less than the predetermined threshold, then a determination is made as to whether a second vehicle is currently approaching the first vehicle, that is, whether the straight-line distance between the two vehicles is decreasing (step 220). In a preferred embodiment, the determination in step 220 as to whether a second vehicle is currently approaching the first vehicle is made by the processor 120 of FIG. 1 based on information provided by the detection unit 110 of FIG. 1, most preferably by one or more radars 114 thereof.

If it is determined in step 220 that a second vehicle is currently approaching the first vehicle, then determinations are made as to a position of the first vehicle (step 222) and a lane or path of the second vehicle (step 224). Otherwise, no action is taken, and the process preferably re-starts at step 202. In a preferred embodiment, a second vehicle is considered to be approaching the first vehicle if it is approaching the first vehicle from behind or from a left or right side of the first vehicle, although this may vary in other embodiments. Also in a preferred embodiment, the determinations as to the position of the first vehicle and the lane or path of the second vehicle are made by the processor 120 of FIG. 1 based on information provided by one or more radars 114 of the detection unit 110 of FIG. 1.

A determination is then made as to whether the lane or path of the second vehicle is at least substantially proximate to the position of the first vehicle (step 226). In a preferred embodiment, the lane or path of the second vehicle is considered to be proximate to the position of the first vehicle if the lane or path of the second vehicle will intersect with the position of the first vehicle in a manner that is likely to lead to a collision between the first and second vehicles if the first vehicle remains in its current lane or path and the first vehicle is not moved from its position or if the second vehicle will pass in an adjacent lane to the first vehicle. This determination is preferably made by the processor 120 of FIG. 1 using information provided by the detection unit 110 of FIG. 1.

If a determination is made that the lane or path of the second vehicle is not at least substantially proximate to the position of the first vehicle, then no action is taken, and the process preferably re-starts at step 202. However, if a determination is made that the lane or path of the second vehicle is at least substantially proximate relative to the position of the first vehicle, then one or more modifications to the hazard light are introduced. Specifically, in one embodiment, the blinking rate of the hazard light is increased (step 228). In another embodiment, the visual intensity of the hazard light is increased (step 230). In a preferred embodiment, the hazard light's blinking rate and visual intensity are both increased. Also in a preferred embodiment, these modifications to the hazard light are performed by the controller 112 of FIG. 1, most preferably by the processor 120 thereof. In certain other embodiments, multiple hazard lights on the vehicle may be similarly modified.

As referenced above, if it is determined in step 202 that the hazard light is not in operation, then the process proceeds to step 232. In step 232, a determination is made as to whether a turn signal of the vehicle is in operation. In a preferred embodiment, this determination is made by the processor 120 of FIG. 1 based on information provided by one or more sensors 115 of the detection unit 110 of FIG. 1 with respect to the left turn signal 104 and the right turn signal 108 of FIG. 1.

If it is determined that a turn signal is in operation, then a further determination is made as to whether the first vehicle is moving (step 234). Otherwise, no action is taken, and the process preferably re-starts at step 202. In a preferred embodiment, the determination in step 234 as to whether the first vehicle is moving is made by the processor 120 of FIG. 1 based on information provided by one or more sensors 115 of FIG. 1, such as a wheel speed sensor.

If it is determined that the vehicle is not moving, then no action is taken, and the process preferably re-starts at step 202. Otherwise, if it is determined that the vehicle is moving, an intended lane or path of the first vehicle is determined (step 236). In certain preferred embodiments, the determination as to the intended lane or path of the first vehicle is made by the processor 120 of FIG. 1 based on information provided by one or more sensors 115 of FIG. 1 that are preferably coupled to a road wheel or a steering column of the first vehicle.

A determination is then made as to whether a second vehicle is approaching the first vehicle, and, specifically, preferably whether the second vehicle is attempting to move into the intended lane or path of the first vehicle (step 238). In a preferred embodiment, the second vehicle is considered to be attempting to move into the intended lane or path of the first vehicle if the second vehicle has a path that will intersect with a path of the first vehicle so that the first and second vehicles are likely to collide if they continue in their respective paths. In a preferred embodiment, this determination is made by the processor 120 of FIG. 1 based on information provided by the detection unit 110 of FIG. 1.

If it is determined that the second vehicle is not attempting to move into the intended lane or path of the first vehicle, then no action is taken, and the process preferably re-starts at step 202. Otherwise, if it is determined that the second vehicle is attempting to move into the intended lane or path of the first vehicle, then one or more modifications to the turn signal are introduced. Specifically, in one embodiment, the blinking rate of the turn light is increased (step 240). In another embodiment, the visual intensity of the turn signal is increased (step 242). In a preferred embodiment, the turn signal's blinking rate and visual intensity are both increased. Also in a preferred embodiment, these modifications to the turn signal are performed by the controller 112 of FIG. 1, most preferably by the processor 120 thereof. In a preferred embodiment, either the left turn signal 104 or the right turn signal 108 is modified, depending on which of these turn signals were determined to be in operation in step 232.

The process 200 thus provides an indication or warning to oncoming drivers of approaching vehicles of the status of the first vehicle. Specifically, the blinking rate and/or the visual intensity of the hazard light is preferably increased when a second vehicle approaches the first vehicle while the first vehicle is motionless with its hazard light on (steps 220-230), or when a second vehicle is approaching behind the first vehicle while the first vehicle's hazard light is on (steps 204-214). If the first vehicle is motionless and there is a continuous flow of approaching vehicles, then the modification to the hazard light may not be necessary (steps 216-218). In addition, when the first vehicle is making a turn, the blinking rate and/or the visual intensity of a corresponding turn signal of the vehicle is preferably increased when a second vehicle is approaching and attempting to move into the intended lane of the first vehicle (steps 232-242).

It will be appreciated that certain steps of the process 200 may vary from those depicted in FIG. 2 and described herein. It will be similarly appreciated that certain steps of the process 200 may be performed simultaneously and/or in an order different from that depicted in FIG. 2 and described herein.

Accordingly, improved methods, program products, and systems are provided for controlling external visual indicators of vehicles. The improved methods, program products, and systems modify a vehicle's hazard lights or turn signals by making them blink faster or brighter to notify or warn the occupants in approaching vehicles as appropriate, for example when a second vehicle is attempting to turn into the same intended lane as the first vehicle while the first vehicle is making a turn, or when a second vehicle is approaching behind or adjacent to the first vehicle while the first vehicle's hazard light is in operation. This can in result in potentially fewer collisions and/or anxiety for the occupants of the vehicles.

It will be appreciated that, in various embodiments, the disclosed methods, program products, and systems may vary from those depicted in the figures and described herein. It will similarly be appreciated that, while the disclosed methods, program products, and systems are described above as being used in connection with automobiles such as sedans, trucks, vans, and sports utility vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of controlling operation of an external visual indicator for a first vehicle, the method comprising the steps of:
    determining whether a second vehicle is approaching the first vehicle;
    determining a frequency of other vehicles approaching the first vehicle over a time period; and
    modifying the external visual indicator if the second vehicle is approaching the first vehicle and the frequency is less than a predetermined threshold.

2. The method of claim 1, wherein:
    the external visual indicator comprises a light having a blinking rate; and
    the step of modifying the external visual indicator comprises the step of increasing the blinking rate of the light if the second vehicle is approaching the first vehicle and the frequency is less than the predetermined threshold.

3. The method of claim 1, wherein:
    the external visual indicator comprises a light having a visual intensity; and
    the step of modifying the external visual indicator comprises the step of increasing the visual intensity of the light if the second vehicle is approaching the first vehicle and the frequency is less than the predetermined threshold.

4. The method of claim 1, wherein the external visual indicator comprises a hazard light, and the method further comprises the steps of:
    determining whether the first vehicle is moving; and
    determining a path in which the second vehicle is traveling;
    wherein the step of modifying the external visual indicator comprises the step of increasing a blinking rate of the hazard light, a visual intensity of the hazard light, or both, if either (a) or (b) below are satisfied and, if the vehicle is not moving, provided further that the frequency is less than the predetermined threshold:
        (a) the first vehicle is moving, the second vehicle is approaching the first vehicle, the paths of the first vehicle and the second vehicle will intersect or run parallel in a manner that will result in a collision between the first and second vehicles if the first and second vehicles continue in their respective paths; or
        (b) the first vehicle is not moving, the second vehicle is approaching the first vehicle, and the path of the second vehicle is proximate to a position of the first vehicle.

5. The method of claim 1, further comprising the step of:
    determining whether the vehicle is moving;
    wherein the step of modifying the external visual indicator comprises the step of modifying the external visual indicator, regardless of the frequency, if the vehicle is moving.

6. The method of claim 1, wherein:
    the external visual indicator comprises a turn signal; and
    the step of determining whether the second vehicle is approaching the first vehicle comprises the step of determining whether the second vehicle is moving into an intended path of the first vehicle.

7. The method of claim 6, wherein the step of modifying the external visual indicator comprises the step of increasing a blinking rate of the turn signal, a visual intensity of the turn signal, or both, if the second vehicle is moving into the intended path of the first vehicle and the frequency is less than the predetermined threshold.

8. A program product for controlling operation of an external visual indicator for a first vehicle, the program product comprising:
    a program configured to at least facilitate:
        determining whether a second vehicle is approaching the first vehicle;
        determining a frequency of other vehicles approaching the first vehicle over a time period; and
        modifying the external visual indicator if the second vehicle is approaching the first vehicle; and the frequency is less than a predetermined threshold; and
    a non-transitory computer readable storage medium storing the program.

9. The program product of claim 8, wherein:
    the external visual indicator comprises a light having a blinking rate; and
    the program is configured to at least facilitate increasing the blinking rate of the light if the second vehicle is approaching the first vehicle and the frequency is less than the predetermined threshold.

10. The program product of claim 8, wherein:
    the external visual indicator comprises a light having a visual intensity; and
    the program is configured to at least facilitate increasing the visual intensity of the light if the second vehicle is approaching the first vehicle and the frequency is less than the predetermined threshold.

11. The program product of claim 8, wherein:
    the external visual indicator comprises a hazard light; and
    the program is configured to at least facilitate:
    determining whether the first vehicle is moving;
    determining a path in which the second vehicle is traveling; and
    increasing a blinking rate of the hazard light, a visual intensity of the hazard light, or both, if either (a) or (b) below are satisfied and, if the vehicle is not moving, provided further that the frequency is less than the predetermined threshold:
        (a) the first vehicle is moving, the second vehicle is approaching the first vehicle, and the first vehicle is also traveling in the path; or
        (b) the first vehicle is not moving, the second vehicle is approaching the first vehicle, and the path of the second vehicle is proximate to a position of the first vehicle.

12. The program product of claim 8, wherein the program is further configured to at least facilitate:
   determining whether the vehicle is moving; and
   modifying the external visual indicator, regardless of the frequency, if the vehicle is moving.

13. The program product of claim 8, wherein:
   the external visual indicator comprises a turn signal; and
   the program is configured to at least facilitate:
      determining whether the second vehicle is moving into an intended path of the first vehicle; and
      increasing a blinking rate of the turn signal, a visual intensity of the turn signal, or both, if the second vehicle is moving into the intended path of the first vehicle and the frequency is less than the predetermined threshold.

14. A system for controlling operation of an external visual indicator for a first vehicle, the system comprising: program product comprising:
   a detection unit configured to at least facilitate obtaining:
      information regarding the first vehicle and a second vehicle; and
      additional information as to additional vehicles approaching the first vehicle over a time period; and
   a controller configured to be coupled to the detection unit and to the external visual indicator, the controller configured to at least facilitate:
      determining, based at least in part on the information, whether the second vehicle is approaching the first vehicle;
      determining, based at least in part on the additional information, a frequency of other vehicles approaching the first vehicle over the time period; and
      modifying the external visual indicator if the second vehicle is approaching the first vehicle and the frequency is less than a predetermined threshold.

15. The system of claim 14, wherein:
   the detection unit comprises a radar; and
   the controller comprises a processor.

16. The system of claim 14, wherein:
   the external visual indicator comprises a light having a blinking rate; and
   the controller is configured to at least facilitate increasing the blinking rate of the light if the second vehicle is approaching the first vehicle and the frequency is less than the predetermined threshold.

17. The system of claim 14, wherein:
   the external visual indicator comprises a light having a visual intensity; and
   the controller is configured to at least facilitate increasing the visual intensity of the light if the second vehicle is approaching the first vehicle and the frequency is less than the predetermined threshold.

18. The system of claim 14, wherein:
   the external visual indicator comprises a hazard light; and
   the controller is configured to at least facilitate:
      determining, based at least in part on the information, whether the first vehicle is moving; and
      determining, based at least in part on the information, a path in which the second vehicle is traveling; and
      increasing a blinking rate of the hazard light, a visual intensity of the hazard light, or both, if either (a) or (b) below are satisfied and, if the vehicle is not moving, provided further that the frequency is less than the predetermined threshold:
         (a) the first vehicle is moving, the second vehicle is approaching the first vehicle, the paths of the first vehicle and the second vehicle will intersect or run parallel in a manner that will result in a collision between the first and second vehicles if the first and second vehicles continue in their respective paths; or
         (b) the first vehicle is not moving, the second vehicle is approaching the first vehicle, and the path of the second vehicle is proximate to a position of the first vehicle.

19. The system of claim 14, wherein:
   the controller is further configured to at least facilitate:
   determining whether the vehicle is moving; and
   modifying the external visual indicator, regardless of the frequency, if the vehicle is moving.

20. The system of claim 14, wherein:
   the external visual indicator comprises a turn signal; and
   the controller is configured to at least facilitate:
   determining, based at least in part on the information, whether the second vehicle is moving into an intended path of the first vehicle; and
   increasing a blinking rate of the turn signal, a visual intensity of the turn signal, or both, if the second vehicle is moving into the intended path of the first vehicle and the frequency is less than the predetermined threshold.

* * * * *